Nov. 28, 1961  N. O. BRODERSON  3,010,158
METHOD FOR MAKING PLASTIC ARTICLES
Filed Jan. 27, 1959  2 Sheets-Sheet 1
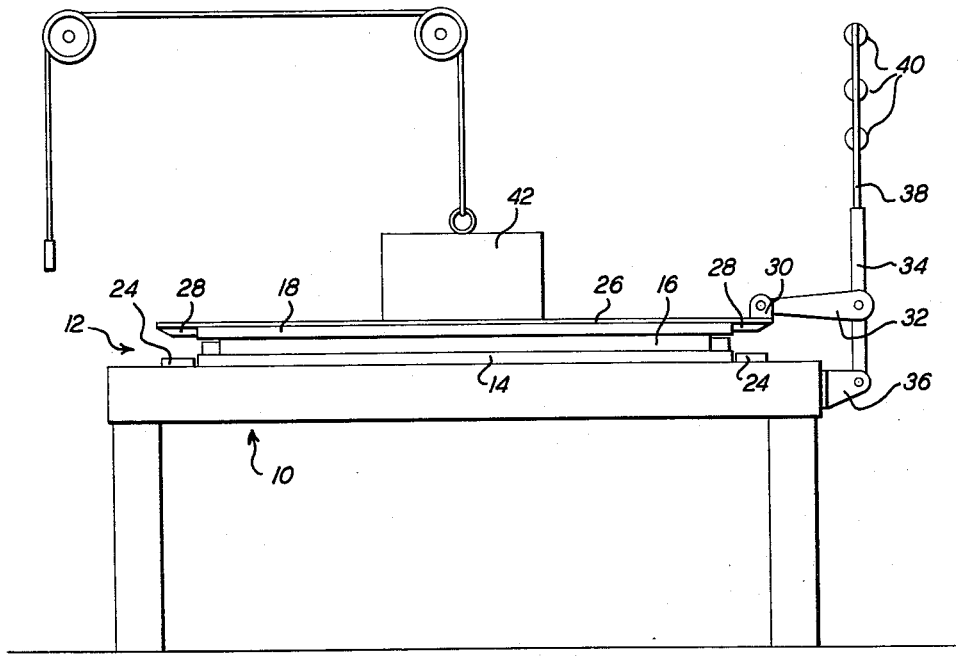
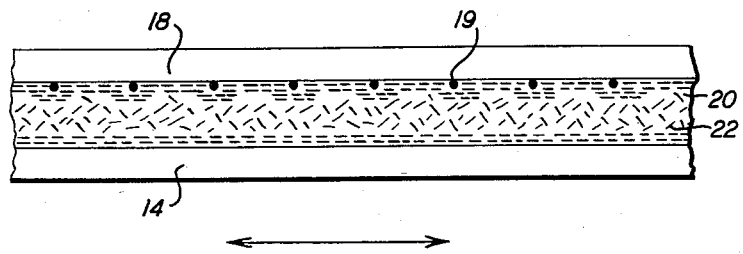
INVENTOR.
NEIL O. BRODERSON
BY Harold T. Stowell
Harold L. Stowell
ATTORNEY

INVENTOR.
NEIL O. BRODERSON

United States Patent Office 3,010,158
Patented Nov. 28, 1961

3,010,158
METHOD FOR MAKING PLASTIC ARTICLES
Neil O. Broderson, Rochester, N.Y., assignor to Capital Plastics, Inc., Rochester, N.Y., a corporation of New York
Filed Jan. 27, 1959, Ser. No. 789,346
7 Claims. (Cl. 18—58)

This invention relates to methods for forming articles of polymerizable plastic compositions having light-reflective lamellae incorporated therein, to provide the articles with a variegated integral sheen.

Integral sheen, as used herein, is generally independent of the surface treatment or configuration of the article and is due to a more or less ordered or systematic orientation within the material itself of lamellae having light-reflecting properties. Thus the term integral sheen includes the effects commonly referred to in the plastics industry by the terms pearly, nacreous, silky, pearlescent, metallic, and chatoyant.

Many substances have been widely used in the plastics industry for imparting integral sheen to various transparent, or translucent, plastic materials. Such substances include pearl essence and other organic substances of similar character, lamellae salts, such as acid lead phosphates and arsenates, and metallic powders such as aluminum and bronze powders.

All of these substances have the common property of reflecting light with or without imparting coloration to the plastic material within which the lamellae are incorporated.

It is well recognized that in order to obtain integral sheen, the light-reflecting lamellae must be positioned or oriented so that a large percentage thereof lie with their light-reflecting surfaces parallel to each other and substantially parallel to the surface of the plastic material which is to have the integral sheen appearance.

A highly satisfactory method and apparatus for forming plastic articles having integral sheen is described in application Serial No. 549,948 filed November 30, 1955 by Neil O. Broderson and now abandoned. The method of said application generally comprises forming a suspension of light reflecting lamellae in a polymerizable plastic composition in tacky liquid form introducing the suspension into a container to provide a tacky mass thereof having a free surface, contacting the free surface of the mass with a member movable with respect to the container in a plane substantially parallel to the free surface of the mass and moving said member relative to the container to subject the mass to oscillatory motion while causing at least partial induration of the plastic composition.

A primary object of the present invention is the provision of a method for forming plastic articles having a greater variety of integral sheen effects than are obtainable by the method of the said application.

A further object of the invention is the production of plastic articles having a variegated or patterned integral sheen.

Another object of the invention is the provision of a method whereby controlled and reproducible variegated or patterned integral sheen may be obtained in plastic articles.

It has been found that these and other objects and advantages may be attained by the method of the invention which comprises forming a suspension of light-reflecting lamellae in a polymerizable plastic composition which is tacky and in liquid form, providing a mass of said suspension having at least one extended surface, applying to localized areas of said surface a substance having a substantial accelerating action on the rate of polymerization of said composition, contacting said surface with a coextensive solid member, and thereafter effecting oscillatory movement of the mass in planes parallel to the surface by oscillating the member in its plane while causing at least partial induration of said plastic composition. The contacting solid member may be provided by a bottom wall of a container for the mass of plastic composition in which case the accelerator is applied to the inner surface of the bottom wall before the plastic composition is put into the container, or the contacting solid member may be applied to the free surface of a mass of the plastic composition in a suitable container after the accelerator has been applied either to the free surface of the plastic composition in the container or to the contacting surface of a solid member such as a cover plate.

In the areas of the surface of the polymerizable mass which are in contact with the applied accelerator a localized increase in the rate of polymerization with respect to the remainder of the mass forms local nuclei or zones of relatively higher viscosity. Under the influence of the oscillatory motion of the hardening mass the lamellar pigment particles are to a large degree brought into similar orientation with their faces substantially parallel to the surface of the mass. However, in the method of the invention, the regularity of orientation of the particles is locally varied by the drag effect of the zones of higher viscosity produced by the locally applied accelerator composition, thus producing a variegated or patterned rather than a uniform integral sheen. The pattern of the integral sheen thus produced is subject to a wide but controllable and reproducible range of variations depending on the pattern of application of the accelerator and the direction and amplitude of the oscillatory movement of the mass.

Instead of applying an accelerating composition to the extended surface of the composition, the variegated integral sheet effects of the invention may also be obtained by irradiating the extended surface with the accelerating radiation, for example, infra-red light rays, through a contacting plate transparent to the accelerating radiation, for example, through a suitably masked glass plate.

There are numerous plastic compositions, including different formulations of polyester resins, which with added catalysts and elevated temperatures pass through a gel state before becoming hard and rigid. The commercially available polyester resins are well suited for use in the present invention. For example, the reaction product of various dibasic acids, both saturated and unsaturated, with various glycols dissolved in 20 to 50 percent of a polymerizable monomer selected from the group styrene, vinyltoluene, diallyl phthalate, methyl methacrylate give very satisfactory results.

Peroxide catalyst such as benzoyl peroxide, methyl ethyl ketone peroxide, cumene hydroperoxide, and t-butyl perbenzoate may be employed with such polyester resins as is well known in the art, as well as various accelerators and promoters which generally fall into the groups of amines, mercaptans, metallic oxides, metal napthenates, etc.

In general, the choice of catalysts, accelerators, and/or promoters, and the quantities of these agents are determined so that after mixing with the resins and pigments, the resin will not increase substantially in viscosity and undergo gelation before the mixture can be transferred to the mold or before contact with the free surface of the plastic composition by a portion of the mold is brought about.

The pigments required to provide nacreous products fall into two types, organic and inorganic. The quantity of light-reflecting lamellar pigments employed depends on the degree of luster and optical density desired in the finished product. With guanine crystals derived from fish as little as 0.1% to about 0.4% by weight will give useful products while if inorganic lamellar pigments such as lead acid arsenate, lead acid phosphate, basic lead carbonate are employed from about 0.25% to upwards of 2.0% may be used.

In addition to the polyester resins, other polymerizable plastic compositions may be readily employed in the practice of the present invention, such as, vinyl compounds, styrenes, acrylics, phenolics and aminoplastics.

Accelerator compositions which may be applied to localized areas of an extended surface of the polymerizable mass in accordance with the invention are well known in the plastic art. Particularly suitable for use with polyester resin compositions are quaternary amine compounds including long chain alkyl groups, such as, lauryl trimethyl ammonium chloride and methyldodecylbenzyl trimethyl ammonium chloride, dissolved or dispersed in a suitable medium. The accelerator compositions may be applied to localized areas of extended surfaces of the plastic compositions or to the contacting surfaces of container walls or covers in the selected pattern as is more fully described hereinafter, by spraying the composition through stencils, by offset printing methods or by free-hand application.

The invention will be more fully described with reference to the accompanying drawings in which:

FIG. 1 is a diagrammatic elevational view of one form of apparatus suitable for practicing the method of the application;

FIG. 2 is a fragmentary enlarged elevational view of the mold portions of the apparatus of FIG. 1.

Figure 3:
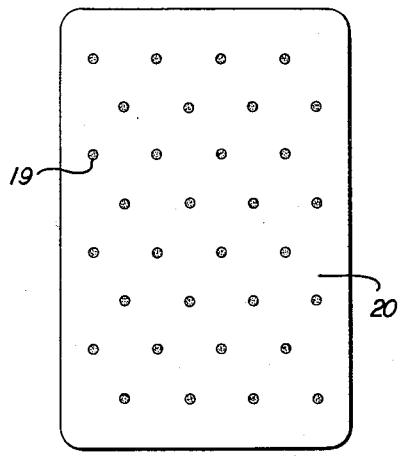
FIGS. 3–6 are illustrative patterns of localized application of accelerator compositions to an extended surface of the plastic composition in accordance with the principles of the invention.
Figure 4:
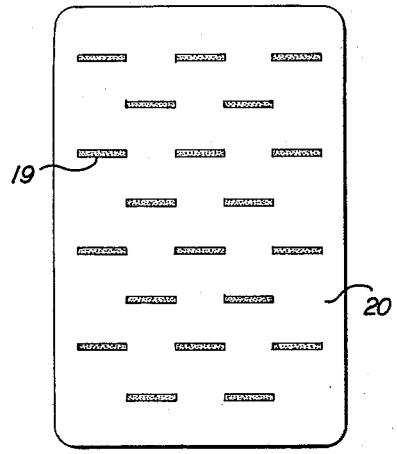
Figure 5:
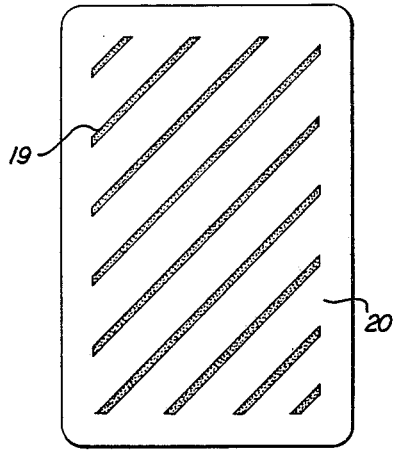
Figure 6:
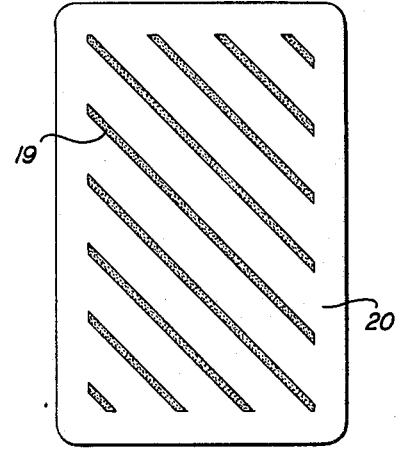

With reference to FIGS. 1 and 2 of the drawings, 10 generally designates a support for mold 12. The mold 12 comprises a lower portion or wall 14 having upstanding side portions 16 and a top plate or portion 18. The mold portions 14 and 18 cooperate to provide a cavity adapted to receive a liquid polymerizable plastic composition 20 having incorporated therein lamellae 22 of the light-reflecting type. The base of the lower mold portion 14 is secured to the top of the support 10 by frame members or the like 24 which prevent relative movement between the support and mold portion 14. The upper mold portion 18 is secured to a frame or cover 26 by clamps or cleats 28.

One of the ends of the frame 26 is provided with an upstanding boss 30 having pivotally secured thereto an arm 32, which arm is pivotally mounted to lever arm 34. One end of the lever arm 34 is pivotally mounted to bracket 36 rigidly secured to the support 10 while the other end of the lever arm 34 is provided with an upstanding resilient member 38 constructed, for example, of spring steel. The spring member 38 has secured thereto a plurality of hand gripping elements 40 in spaced relation to the point of pivotal connection between the arm 32 and the lever 34. A removable weight 42 may be provided for urging the two mold portions 14 and 18 into contact with side portions 16 as shown in FIG. 1.

In operation of this form of the invention a polymerizable plastic material, as described above, provided with a suitable hardening catalyst and containing light-reflecting lamellae, either guanine or synthetic, is poured while in the tacky liquid state within the cavity formed between the cooperating mold portions. An accelerator composition in liquid form is applied in a preselected pattern, for example, the pattern of FIG. 3, to the under surface of upper mold portion 18, as schematically indicated at 19 in FIG. 2; or the accelerator may be applied in the same or a different pattern also, or only, to the upper surface of the bottom wall 14 of the mold before the polymerizable plastic composition is poured into the mold. A suitable accelerator composition for use with a benzoyl-peroxide catalysed polyester resin, is provided by a 10% solution of lauryl trimethyl ammonium chloride in a mixture of 65% water and 35% Butyl Cellosolve. The weight 42 is then applied to the frame 26 to hold the mold portions in the closed position. One of the hand gripping members 40, secured to spring element 38, is then gripped and said hand gripping element is pushed and pulled in a direction to cause relative reciprocating movement between mold portions 14 and 18 through lever 34 and arm 32. As the mold portion 18 reciprocates relative to the mold portion 14 secured to support 10, movement of the plastic material sandwiched therebetween is brought about orienting the lamellae contained therein. Since the mold portion or plate 18 is in contact with the sticky plastic material 20 and adheres thereto, the reciprocation of plate 18 will drag the upper surface of the material 20 back and forth and thereby subject the soft plastic mass 20 to an oscillatory motion in planes substantially parallel to plate 18 so that the lamellae 22 are thereby oriented with their surfaces substantially parallel to plate 18 and the upper surface of the plastic mass 20. As the plastic material polymerizes, the increased viscosity thereof causes greater resistance to the relative movement between the mold portions which are in adhesive contact with the plastic. When the material reaches a gel stage and substantially all of the crystals therein have become oriented, the resistance to relative movement of the mold portions will be greater than the tension in spring element 38 whereby, if the operator continues to push and pull on one of the handles 40, the spring 38 will bend without imparting relative movement to the mold portions. By providing the plurality of hand gripping members 40, the operator can predetermine at what stage in the polymerization of the plastic material relative movement of the mold portions will be discontinued. For example, if the relative movement between the mold portions is desired to be carried further into the period of gelation, then the lower hand grip 40 would be engaged in operating the device.

After the internal frictional resistance of the plastic material has overcome the spring tension member 38, the plastic material may be left in the mold cavity until complete polymerization has occurred or it may be removed therefrom and subjected to further indurating conditions, either before or after other mechanical or chemical treatment of the plastic material is brought about. For example, if the plastic material is to be used in the manufacture of buttons, the partially polymerized sheet material within the mold may be cut into a plurality of button blanks, which blanks may then be turned and drilled prior to final hardening.

Other forms of apparatus such as those illustrated and described in the aforementioned application Serial No. 549,948 may also be used. The provision of a resilient member 38 as in the apparatus of FIG. 1 or other torque responsive device is not essential in practicing the method of the invention as with a little experience the operator of the apparatus soon becomes highly adept at sensing the proper point for discontinuing motion of the mold as the torque applied to the handle increases. With either manually or motor driven apparatus, the proper point for discontinuing motion can also be accurately determined by the operator after a little experience by inspecting the surface of the hardening mass through a transparent top plate, for example, a glass plate.

FIGS. 3, 4, 5 and 6 are illustrative of various patterns of application of accelerating agent which may be used. A wide range of variegated sheen effects may be obtained by the use of relatively simple patterns in combination with different amplitudes and forms of oscillatory motion of the plastic body contacting solid surface, for example, using reciprocating, circular or elliptical oscillating, or other forms of motion. Further variations may be introduced by using the different patterns of localized acceleration on the top and bottom surfaces of a plastic mass, for example, the pattern of FIG. 5 on one surface and the pattern of FIG. 6 on the other surface.

It will be seen that a wide variety of procedures can be used to obtain a wide range of variegated integral sheen effects within the scope of the invention as herein described.

I claim:

1. A method of forming articles of polymerized plastic composition which comprises forming a suspension of light-reflecting lamellae in a polymerizable plastic composition which is tacky and in liquid form, providing a mass of said suspension having at least one extended surface, applying to localized areas of said surface a substance having a substantial accelerating action on the rate of polymerization of said composition, adhesively contacting said surface with a coextensive solid member, and thereafter effecting oscillatory movement of the mass by oscillating said contacting member in the plane of contact while causing at least partial induration of said plastic composition.

2. A method as defined in claim 1 wherein said contacting solid member is provided by a wall of a container for said mass and said accelerating substance is applied to the surface of said wall prior to the forming of said mass in the container.

3. A method of forming articles of polymerizable plastic composition which comprises forming a suspension of light-reflecting lamellae in a polymerizable plastic composition in liquid form, providing a mass of said suspension having at least one substantially planar extended surface, applying to localized areas of said surface a substance having a substantial accelerating action on the rate of polymerization of said composition, and subjecting said mass to oscillatory motion in planes parallel to the plane of said surface while causing at least partial induration of said plastic composition.

4. A method as defined in claim 3 wherein the extended surface of said mass is in contact with the bottom wall of a container for said mass and said accelerating substance is applied to said surface by placing the substance on the wall prior to placing said mass in the container.

5. A method as defined in claim 3 wherein said mass has one extended surface in contact with a wall of the container for the mass and a second extended free surface, and said accelerating substance is applied to localized areas of both of said extended surfaces.

6. A method of forming a sheet of plastic material having patterned integral sheen which comprises making a suspension of light-reflecting lamellae in a polymerizable plastic composition in liquid form, placing a mass of the suspension in a container to form at least one extended plane surface on the mass, causing at least partial polymerization of the mass and accelerating the rate of polymerization at localized areas of the surface of the mass while orienting the lamellae during said partial polymerization by oscillating the mass in planes substantially parallel to said surface.

7. A method of forming a sheet of plastic material having patterned integral sheen which comprises making a suspension of light-reflecting lamellae in a polymerizable plastic composition which is tacky and in liquid form, placing a mass of the suspension in a container so as to form an extended planar free surface on the mass, applying to localized areas of said surface a substance having a substantial accelerating action on the rate of polymerization of the composition, adhesively engaging said surface with a coextensive solid member, and effecting oscillatory movement of said member in the plane of contact while causing at least partial polymerization of said composition.

References Cited in the file of this patent

UNITED STATES PATENTS

| | | |
|---|---|---|
| 1,682,359 | Straub | Aug. 28, 1928 |
| 1,873,951 | Zocher | Aug. 30, 1932 |
| 2,165,973 | Land | July 11, 1939 |
| 2,281,100 | Land | Apr. 28, 1942 |
| 2,289,713 | Land | July 14, 1942 |
| 2,372,177 | Conner | Mar. 27, 1945 |
| 2,398,506 | Rogers | Apr. 16, 1946 |
| 2,480,749 | Marks | Aug. 30, 1949 |